US009842285B2

(12) United States Patent
Ishiyama

(10) Patent No.: US 9,842,285 B2
(45) Date of Patent: *Dec. 12, 2017

(54) COLLATION/RETRIEVAL SYSTEM, COLLATION/RETRIEVAL SERVER, IMAGE FEATURE EXTRACTION APPARATUS, COLLATION/RETRIEVAL METHOD, AND PROGRAM

(75) Inventor: Rui Ishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 53 days.

This patent is subject to a terminal disclaimer.

(21) Appl. No.: 14/235,292

(22) PCT Filed: Jul. 25, 2012

(86) PCT No.: PCT/JP2012/068828
§ 371 (c)(1),
(2), (4) Date: Jan. 27, 2014

(87) PCT Pub. No.: WO2013/018614
PCT Pub. Date: Feb. 7, 2013

(65) Prior Publication Data
US 2014/0153831 A1 Jun. 5, 2014

(30) Foreign Application Priority Data
Jul. 29, 2011 (JP) .................................. 2011-166789

(51) Int. Cl.
*G06K 9/46* (2006.01)
*G06K 9/78* (2006.01)
(Continued)

(52) U.S. Cl.
CPC ........... *G06K 9/78* (2013.01); *G06K 9/00577* (2013.01); *G06K 9/2063* (2013.01);
(Continued)

(58) Field of Classification Search
CPC ............. G06K 9/00577; G06K 9/6255; G06K 9/00281; G06K 2009/0059; G06K 9/481;
(Continued)

(56) References Cited

U.S. PATENT DOCUMENTS

| 4,720,960 A | * | 1/1988 | Green | ................. | B65H 39/043 |
| | | | | | 270/58.06 |
| 6,067,369 A | * | 5/2000 | Kamei | ................. | G06K 9/4633 |
| | | | | | 382/125 |

(Continued)

FOREIGN PATENT DOCUMENTS

| EP | 2682912 A1 | 1/2014 |
| JP | 2000-099739 A | 4/2000 |

(Continued)

OTHER PUBLICATIONS

Extended European Search Report issued in corresponding European Application No. 12820131.6, dated Feb. 5, 2016, 11 pages.

(Continued)

*Primary Examiner* — Aklilu Woldemariam
(74) *Attorney, Agent, or Firm* — Wilmer Cutler Pickering Hale and Dorr LLP

(57) ABSTRACT

The present invention is a collation/retrieval system collating a product manufactured by or delivered from a producer or a distributor with a product to be collated comprising: a storage unit that stores an image feature of a predetermined collation area of the product determined in advance at a position relative to a reference section common in every product; a to-be-collated product feature extraction unit that receives an image of the product to be collated and detecting the reference section of the product from the received image to extract an image feature of the collation area determined by reference to the reference section; and a collation unit that (Continued)

collates the stored image feature with the image feature of the collation area of the product to be collated.

21 Claims, 5 Drawing Sheets

(51) Int. Cl.
*G06Q 30/00* (2012.01)
*G06Q 30/02* (2012.01)
*G06K 9/00* (2006.01)
*G06K 9/20* (2006.01)

(52) U.S. Cl.
CPC ..... *G06Q 30/0185* (2013.01); *G06Q 30/0278* (2013.01); *G06K 9/46* (2013.01)

(58) Field of Classification Search
CPC .. G06K 9/6204; G06K 17/00; G06Q 30/0185; G06Q 10/08; G06Q 50/02; G06Q 50/28; G06Q 10/06; G06Q 10/087; G06Q 10/10; G06Q 10/20; G06Q 20/10; G06Q 30/0222; G06Q 30/0283; G06Q 30/04; G06Q 30/0601; G06Q 40/00; G06Q 40/04; G06Q 40/12; G06Q 40/123; G06Q 40/125; G06T 7/0044; G03G 2215/00109; H04N 1/00037; H04N 1/00058; H04N 1/00082; H04N 1/00891; H04N 1/00896; H04N 2201/0094; H04N 1/00326; H04N 1/00376; H04N 1/00968; A01F 29/005; A61L 2/28; A61M 2005/3104; A61M 5/002; A61M 5/3202; B23K 20/124; B23K 20/1255; E02D 17/08; Y10T 403/7016; B41J 2/16511; B41J 2/16585; B42C 19/02; B42P 2261/04; B65H 29/34; B65H 37/04; G06F 3/1265; G06F 3/1284
USPC ........ 382/115, 124, 125, 190, 278; 345/179, 345/419
See application file for complete search history.

(56) References Cited

U.S. PATENT DOCUMENTS

| | | | |
|---|---|---|---|
| 7,577,601 B1* | 8/2009 | Rademacher | G06Q 40/00 705/35 |
| 8,437,528 B1* | 5/2013 | Csulits | G07D 7/04 382/135 |
| 8,761,508 B2* | 6/2014 | Kimura | G06K 9/00577 382/173 |
| 8,787,707 B1* | 7/2014 | Steves | G06Q 30/02 382/181 |
| 2002/0097906 A1* | 7/2002 | Ishiyama | G06K 9/00268 382/154 |
| 2003/0015396 A1* | 1/2003 | Mennie | G06M 7/06 194/206 |
| 2003/0059098 A1* | 3/2003 | Jones | G06Q 20/042 382/135 |
| 2004/0079800 A1 | 4/2004 | Sugino et al. | |
| 2004/0267660 A1* | 12/2004 | Greenwood | G06Q 40/025 705/38 |
| 2005/0129285 A1* | 6/2005 | Mino | G06K 9/00221 382/115 |
| 2006/0011504 A1 | 1/2006 | Gosebruch et al. | |
| 2006/0118437 A1 | 6/2006 | Gosebruch et al. | |
| 2006/0277141 A1* | 12/2006 | Palmer | G06Q 40/02 705/38 |
| 2007/0177807 A1* | 8/2007 | Enomoto | G06K 9/6255 382/224 |
| 2008/0094377 A1* | 4/2008 | Zander | G06F 3/0321 345/179 |
| 2008/0219503 A1 | 9/2008 | Di Venuto et al. | |
| 2008/0303814 A1* | 12/2008 | Ishiyama | G06K 9/00214 345/419 |
| 2009/0013268 A1* | 1/2009 | Amit | G06T 11/60 715/763 |
| 2009/0084981 A1* | 4/2009 | Bown | G01N 21/8806 250/459.1 |
| 2009/0089175 A1* | 4/2009 | Platek | G06Q 10/08 705/26.1 |
| 2009/0319388 A1* | 12/2009 | Yuan | G06Q 30/0601 705/26.1 |
| 2010/0063870 A1* | 3/2010 | Anderson et al. | 705/10 |
| 2011/0135160 A1 | 6/2011 | Sagan et al. | |
| 2013/0202154 A1* | 8/2013 | Hirano | G06T 3/0006 382/103 |
| 2013/0230235 A1* | 9/2013 | Tateno | G06T 7/75 382/154 |
| 2013/0339265 A1* | 12/2013 | Ishiyama | G06Q 10/06 705/333 |

FOREIGN PATENT DOCUMENTS

| | | |
|---|---|---|
| JP | 3355366 B2 | 10/2002 |
| JP | 2006-146570 A | 6/2006 |
| JP | 2007-052611 A | 3/2007 |
| JP | 2007-135501 A | 6/2007 |
| JP | 2009-129424 A | 6/2009 |
| WO | WO-2009/115611 A2 | 9/2009 |

OTHER PUBLICATIONS

Joshua R. Smith, et al. "Microstructure Based Indicia", XP-002422978, (1999), [retrieved on Mar. 1, 2007], http://web.media.mit.edu/~jrs/jr_microstructure.pdf, 5 pages.
Japanese Office Action issued in corresponding Japanese Patent Application No. 2013-526842, dated Mar. 22, 2017, 6 pages.
International Search Report corresponding to PCT/JP2012/068828 dated Aug. 28, 2012 (5 pages).
European Communication Pursuant to Article 94(3) EPC issued in European Patent Application No. 12820131.6, dated Sep. 27, 2017, 4 pages.
Japanese Notification of Refusal issued in Japanese Patent Application No. 2013-526842, dated Oct. 3, 2017, 6 pages.
Diako Mardanbegi, et al. "Mobile Gaze-based Screen Interaction in 3D Environments" XP05524053, NGCA '11, May 26-27, 2011, Karlskrona, Sweeden, 4 pages.

* cited by examiner

US 9,842,285 B2

COLLATION/RETRIEVAL SYSTEM, COLLATION/RETRIEVAL SERVER, IMAGE FEATURE EXTRACTION APPARATUS, COLLATION/RETRIEVAL METHOD, AND PROGRAM

CROSS-REFERENCE TO RELATED APPLICATIONS

This application is a national stage application of International Application No. PCT/JP2012/068828 entitled "Collation/Retrieval System, Collation/Retrieval Server, Image Feature Extraction Apparatus, Collation/Retrieval Method, and Program," filed on Jul. 25, 2012, which claims the benefit of the priority of Japanese patent application No. 2011-166789, filed on Jul. 29, 2011, the disclosures of each of which are hereby incorporated by reference in their entirety.

TECHNICAL FIELD

The present invention relates to a collation/retrieval system, a collation/retrieval server, an image feature extraction apparatus, a collation/retrieval method, and a program.

BACKGROUND ART

In recent years, commitment to quality of products comes to be stronger among consumers and retailers. However, there was no means for the consumers and the retailers to know whether or not the products arrived at stores are genuine or whether or not the products they received are from authorized agents.

In other words, in the conventional system for distributing products, many middlemen (e.g., several wholesale stores) exist between the producers and consumers. Such conventional system, in which many middlemen exist between the producers and consumers, makes it difficult to provide the consumers accurate information about each individual product (e.g., information about a producing area, a producer name, a kind, a production date, and quality of the each individual product) when the products arrives at the consumers.

As the typical product management system, an information acquisition system acquiring individual information of each farm product has been proposed. The system enables easy providing of the individual information of each farm product to, for example, the consumers (e.g., Patent Document 1).

Patent document 1 discloses such a technique in which an ID number as an own identifier for each individual is given to a farm product such as a melon, resulting in allowing a person (e.g., a consumer) other than the farm producer of the melon (e.g., a commercial farm or an agricultural cooperative) to freely acquire individual information about the melon based on the ID number. For the sake of executing the above system, a label (e.g., a seal or a sticker) with the ID number is attached to the farm product.

Further, the individual information about the farm product is accumulated in a computer system of a separately provided independent neutral organization (e.g., a database company) together with the ID number, resulting in assembling a database. The producer transmits the ID number to the computer system as well as transmits the individual information, corresponding to the farm product, including a producing area, a producer name, a kind, a cultivation method, a harvest date, and quality (e.g., sugar content) of the farm product, to the computer system.

At least one computer is provided to each retailer shop and each consumer's home. Each computer is connected to the computer system via the general public line in a mutually communicative manner. The retailer shop or the consumer transmits the ID number on the label attached to the farm product to the computer system from the computer of his own. This enables the retailer shop or the consumer to acquire the individual information about the farm product identified by the ID number.

For controlling agricultural and marine products stocked by a distributor, it is necessary to know information to be identified (e.g., quality information about an arrival date and a harvest date effecting on freshness and a component different according to a process purpose) in the stock control of each stock product. With the information, for example, stock products having elder arrival date are sold by lowering the price prior to stock products of the same kind having newer arrival date. Conventionally, similarly to the above described technique, attachment of the label with the ID number to the farm product allows the computer system to retrieve stock control information based on the ID number.

RELATED ART DOCUMENTS

Patent Documents

[Patent Document 1]
Japanese Patent No. 3355366

SUMMARY OF INVENTION

Technical Problem

However, in the method as disclosed in patent document 1 in which an individual is identified by a label (e.g., a seal or a sticker) attached to a product or by a packaging material of the product, if the label (hereinafter the "label" includes a packaging material) is removed maliciously or if the label is copied and/or imitated to be attached to another similar product, it was hard or impossible to prevent a fraud, for example, on a consignor of the product.

Further, when the label could not be attached to the product or when the label was detached from the product, it became impossible to retrieve stock control information of such each individual.

Still further, in the case where the producer or the retailer holds a plurality of products of the same kind, the producer or the retailer needs to provide a serial number for each product and attach a label or a tag capable of reading the serial number to each product in order to retrieve information of each individual for the purpose of management of the consignees and control of the stock adjustment one by one in a separate manner. This requires more cost than a case of using a single piece of label or a printing.

Yet further, in some products, e.g., minute parts and food products, it is impossible to directly write onto the products or attach a label or a tag to the products. Also, in other products, since a unit price is inexpensive, it is a burden to prepare different tags to each individual in view of an economical aspect. As a result, it was impossible to use such a system of patent document 1 in which the label (e.g., the seal or the sticker) is attached to each product. Thus, none of the producers, the distributors, the retailers, or the consumers had a means capable of suitably control each product separately.

In a case of performing acceptance quality sampling in a factory, e.g., in a case of retrieving to which lot does a product belong, it was difficult to provide accurate information about each of the products of the same kind (e.g., to provide information different between products even of the same kind, e.g., information about a time of manufacture, a production worker, and manufacturing process) among a vast amount of products. This makes it difficult to identify and manage the products one by one.

Instead of the attachment of a label, embedding of, for example, an IC tag in the product is proposed as one means. However, this damages the product and therefore lowers a value of commodity in a case of an industrial product such as a leather product or a hard disk. Further, there was such a problem that the use of IC tag made the whole system expensive.

The present invention was made to solve the above described problems. A purpose of the present invention is to provide a collation/retrieval system capable of collating and retrieving information about each individual product without requiring any specific device such as an IC tag, a collation/retrieval server, an image feature extraction apparatus, a collation/retrieval method, and a program.

Means for Solving the Problems

The present invention is directed to a collation/retrieval system including a first imaging means capturing an image including at least a reference section common in every product and a predetermined collation area of the product determined in advance at a position relative to the reference section, a product feature extraction means detecting the reference section from the image captured by the first imaging means to extract an image feature of the collation area determined by reference to the detected reference section, a storage means storing the extracted image feature of the collation area of the product, a second imaging means capturing an image including at least the reference section of a product to be collated and the predetermined collation area of the product to be collated determined by reference to the reference section, a to-be-collated product feature extraction means detecting, from the image captured by the second imaging means, the reference section of the product to be collated to extract an image feature of the collation area determined by reference to the reference section, and a collation/retrieval means collating the stored image feature with the image feature of the collation area of the product to be collated.

The present invention is directed to a collation/retrieval server collating a product produced by or delivered from a producer or a distributor with a product to be collated including a storage means storing an image feature of a predetermined collation area of the product determined in advance at a position relative to a reference section common in every product, a to-be-collated product feature extraction means receiving an image of the product to be collated, detecting the reference section of the product to be collated from the received image, and extracting an image feature of the collation area determined by reference to the reference section, and a collation means collating the stored image feature with the image feature of the collation area of the product to be collated.

The present invention is directed to an image feature extraction apparatus including a feature extraction means detecting a reference section common in every product from an image of a product produced by or delivered from a producer or a distributor and an image of a product to be collated to extract an image feature of a collation area determined in advance at a position relative to the detected reference section.

The present invention is directed to a collation/retrieval method including setting a predetermined section formed into the same pattern for every product to a reference section, setting an area existing at a standard position relative to the reference section to a collation area, and using an image feature in the collation area of the product in collation/retrieval of a product.

The present invention is directed to a program causing a computer to detect, from an image of a product produced by or delivered from a producer or a distributor and an image of a product to be collated, a reference section common in every product to extract an image feature of a collation area determined in advance at a position relative to the detected reference section.

The present invention is directed to a collation unit including a feature extraction means detecting, from an image of a product produced by or delivered from a producer or a distributor and an image of a product to be collated, a reference section common in every product to extract an image feature of a collation area determined in advance at a position relative to the detected reference section, and a collation means collating an image feature stored in advance with the image feature of the collation area of the product to be collated.

Effects of the Invention

The present invention is capable of executing, without using any specific device such as an IC tag, collation for the purpose of authenticity determination of a product or retrieval of management information different for each individual among products of the same kind.

DESCRIPTION OF EMBODIMENTS

Embodiments of the present invention will be described below.

Figure 1:
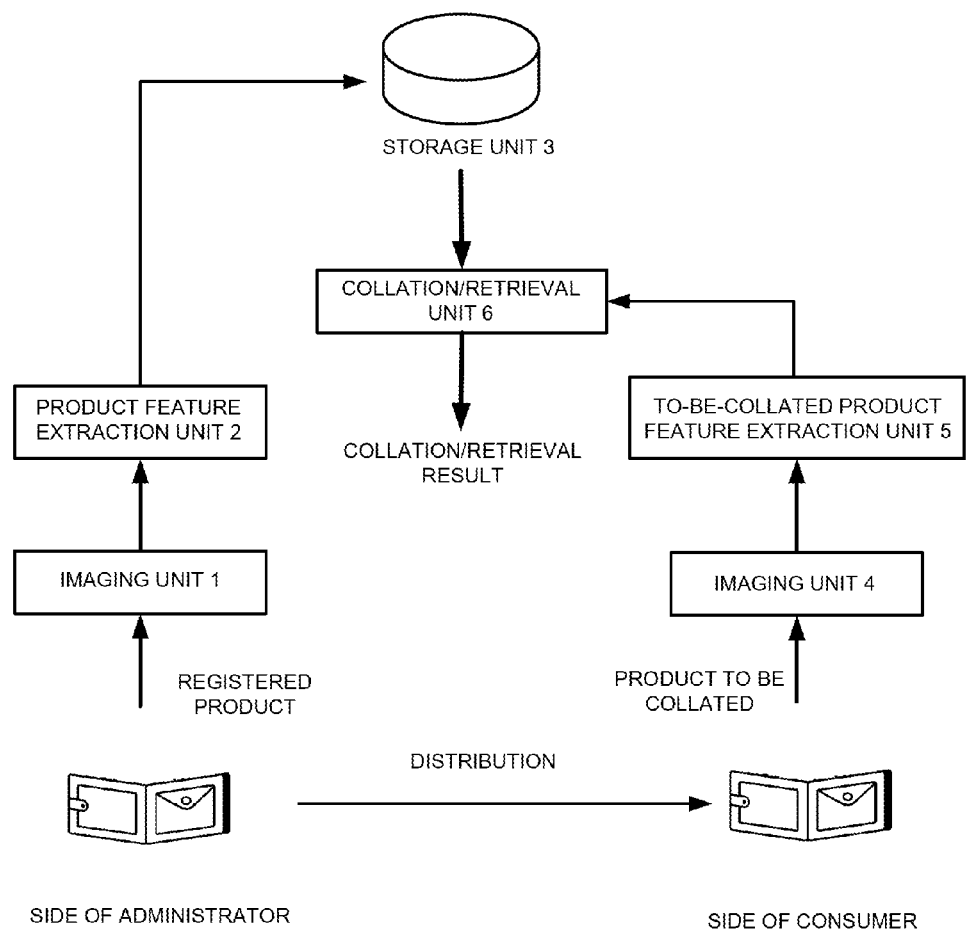
FIG. 1 is a block diagram according to an embodiment of the present invention.

FIG. 1 is a block diagram according to an embodiment of the present invention.

According to an aspect of the embodiment of the present invention, a product collation/retrieval system includes an imaging unit 1 capturing an image including at least a reference section common in every product and a predetermined collation area of the product determined in advance at a position relative to the reference section, a product feature extraction unit 2 detecting the reference section from the image captured by the imaging unit 1 to extract an image feature of the collation area determined by reference to the detected reference section, a storage unit 3 storing the extracted image feature of the collation area of the product, an imaging unit 4 capturing an image including at least the reference section of a product to be collated and the predetermined collation area of the product to be collated determined by reference to the reference section, a to-be-collated product feature extraction unit 5 detecting the reference section of the product to be collated from the image captured by the imaging unit 4 to extract an image feature of the collation area determined by reference to the reference section, and a collation/retrieval unit 6 collating the image feature stored in the storage unit 3 with the image feature of the collation area of the product to be collated.

According to the present invention, the collation/retrieval of a product is performed based on a minute difference of a surface pattern of the individual product. Meanwhile, the product to which the present invention is applied is not limited to anything as far as the each individual product includes a different pattern on the surface thereof. Specific examples of the product include, for example, a leather product, a metal workpiece, molten resin, and an industrial product including a ceramic portion (e.g., a semiconductor chip). Examples of the surface pattern of the product include a surface design of the leather product and a minute uniformity of the molten resin and the ceramic portion.

Here, the general idea of the producer or the distributor includes a person engaged in production (i.e., a production company of an industrial product) and a person engaged in distribution or quality control of products during the distribution of the products (e.g., a wholesaler, a retail shop, and an agent).

Here, the reference section of the product means a trademark, a logotype, a name of manufacturer, a manufacturing company, a brand name, a product name, and a product number attached to, printed, stamped, branded on a product. The reference sections of the products of the same kind commonly have the same pattern and have a characteristic appearance. The positions and the postures of the reference sections of the products are defined as reference standards. Features thereof are stored in the product feature extraction unit 2 and the to-be-collated product feature extraction unit 5. Meanwhile, the reference section is not needed to be changed for each individual. Therefore, a cost can be saved comparing to the conventional means in which different identifier, e.g., different management tag, is provided to the each individual.

Figure 2:
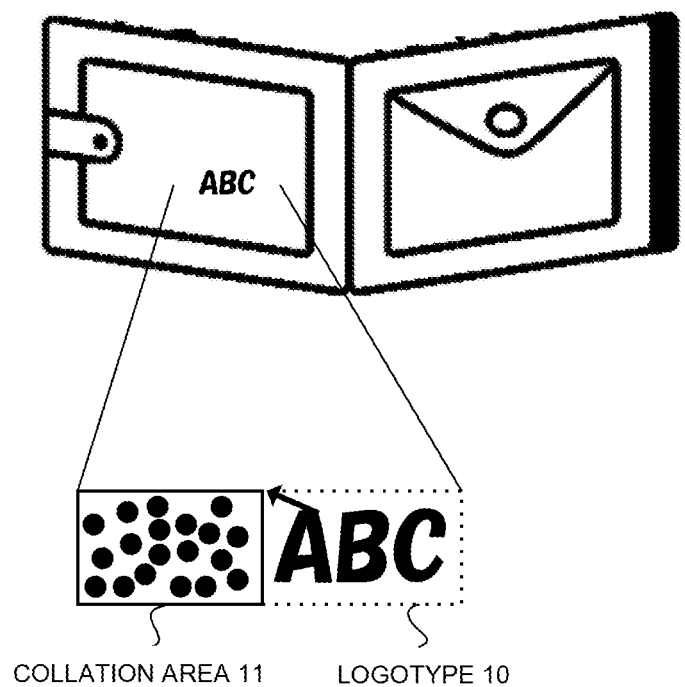
FIG. 2 illustrates a collation area.

Here, the collation area means a partial area on the surface of the product determined in advance at a position relative to the reference section for the purpose of collation with respect to the product. The collation area is set to a position relative to a trademark, a logotype, a name of manufacturer, a manufacturing company, a brand name, a product name, and a product number (i.e., the reference section) attached to, printed, stamped, or branded on the product. For example, in the case where the product is a leather wallet, as shown in FIG. 2, the collation area 11 is defined as follows. First, a top of a top portion of a letter "A" of a logotype 10 stamped on the wallet is determined as a reference. A position X-cm away from the top upwardly by 30 degrees is determined as an upper right top of the collation area 11. A rectangular area defined by a Y-cm length diagonal line extending downwardly by 30 degrees from the upper right top is set to the collation area 11. The setting of the collation area 11 in a manner as described above enables secure identification of the collation area 11 at a position relative to the logotype 10 since normally the same logotype 10 is used.

This is a mere example and, thus, should not be construed in a limiting sense. For example, a vertically and horizontally multiplied range of the logotype 10 can be set as the collation area. Alternatively, the collation area can be defined at a position below the logotype 10. Designation of the position and the range of the collation area by a relative value determined by reference to a size of the logotype enables correction of a position and an orientation of an object when an image of the object is captured and a distance to an image capturing means based on a size and a shape of the known logotype.

Figure 3:
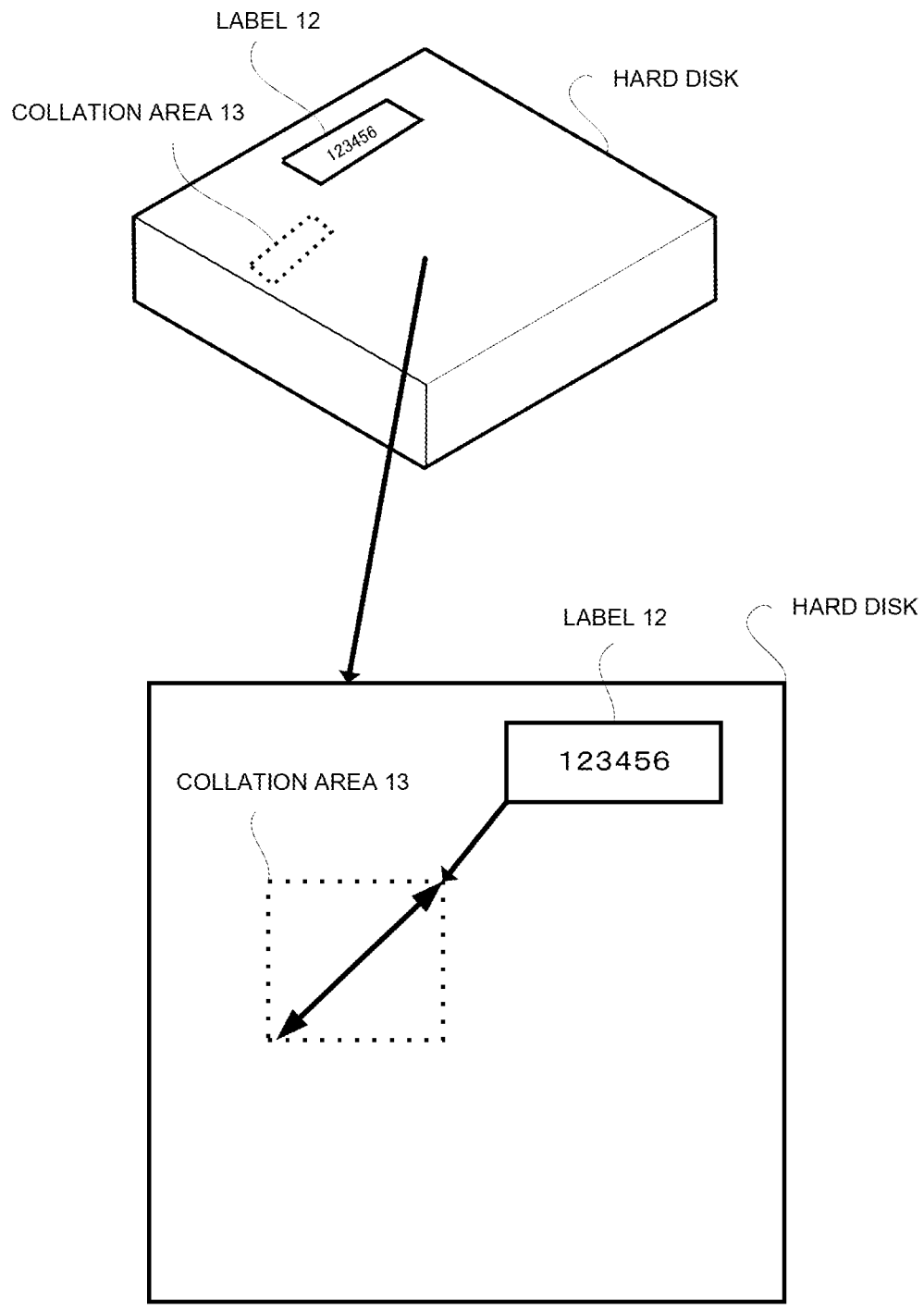
FIG. 3 illustrates another collation area.

FIG. 3 shows another example. FIG. 3 exemplifies a metal product such as a hard disk. In a case of FIG. 3, a collation area 13 is set to a position away from a label 12 by reference to the label attached to the hard disk. Even the metal product such as a hard disk includes a minute uniformity on the surface thereof. That is, the metal products differ one by one. Therefore, the minute uniformity on the surface of the collation area determined by reference to the label also differs for each individual. This enables collation of each individual.

Even when the collation area 13 is positioned away from the label 12, detection of the label 12 enables detection of the collation area 13 at a position relative to the position of the label 12. The collation area 13 can be easily detected by the following manner. For example, a position X-cm away from a lower left top as a reference position of the label 12 downwardly by 45 degrees is set to an upper right top of the collation area 11 and a rectangular area defined by a diagonal line having Y-cm length extending downwardly by 45 degrees from the upper right top is set to the collation area 13. This facilitates detection of the collation area 13.

Next, a structure of each unit will be described below.

The imaging unit 1 belongs to a parson engaged in production (e.g., an industrial product manufacturer) and a parson managing distribution of products and a quality control during the course of distribution. For example, the producer captures an image of the reference section and an image of the collation area of the products by using the imaging unit 1. The imaging unit 1 may be equipped with a specific device in order to capture the image of the collation area of the product. The specific device may be a digital camera with a CCD or a CMOS or a cellular phone. A file format of the captured image may be anything. For example, the file format may be a JPEG.

The product feature extraction unit 2 detects the reference section from the image captured by the imaging unit 1 to extract an image feature of the collation area determined by reference to the reference section. The product feature extraction unit 2 stores in advance a feature of the reference section of the product and, based on the feature, the reference section is detected from the image captured by the imaging unit 1. At the time, the product feature extraction unit 2 normalizes the collation area determined in advance by reference to the reference section based on the position and the posture of the reference section on the image to extract the image feature of the normalized collation area. Extraction of the image feature can be performed by an extraction technique in which the image feature of a fingerprint is extracted by using a brightness value, a feature point, an inflection point of a line of a binarized image, an intersection point, an end point, and a center point of the image. The image features of a plurality of products thus extracted are stored in the storage unit 3. The products recorded (i.e., registered) in the recording unit 3 are hereinafter referred to as registered products.

Further, it is possible to store the image feature of the registered product after the image feature thereof is associated with manufacturing information including a factory name, a producer name, a lot number, a production date, and a quality information, and management information including a shipping point and a ship date of the product. This enables acquisition of also management information of the collated product.

The imaging unit 4 and the to-be-collated product feature extraction unit 5 belong to a side of collating the product such as a retail shop, a distribution manager, and a consumer. The imaging unit 4 and the to-be-collated product feature extraction unit 5 are configured similarly to the imaging unit 1 and the product feature extraction unit 2, respectively.

A collation/retrieval unit 6 collates the image feature of the collation area of the product to be collated, extracted by the to-be-collated product feature extraction unit 5, with the image feature of the collation area of the registered product stored in the storage unit 3. As a result, if a matching point is found therebetween, the collation/retrieval unit 6 determines that the product to be collated has already been registered. Here, collation of the image feature is performed in the following manner. For example, considering an end point, an intersection point, and corners of the line of the surface pattern as the feature points, an arrangement of the feature points are collated. If the number of arrangements of the feature points at the same position (i.e., in a range under a certain threshold) is equal to or more than a predetermined number, the collation/retrieval unit 6 considers as the same product. Such collation technology can employ the known fingerprint matching technology.

As described above, according to this embodiment, a collation determination of the product can be performed without use of a specific tag. At the same, distribution of the product duly delivered from the producer and/or the distributor of the product can be controlled. As a result, fraud on the product such as an evil replacement of the product can be eliminated or reduced.

If the manufacturing information including a production site, a factory name, a producer name, a lot number, a production date, and a quality information of the product, and the management information including a shipping point and a ship date of the product are associated with the image feature of the product in a corresponding manner to be stored, for example, the management information corresponding to the image feature matched during the collating/retrieving can be output together with the collation result. As a result, the consumer can acquire the management information of the product.

The management information retrieval system using the collation system according to the above described embodiment will be described below. The management information retrieval system of this embodiment is made to satisfy a demand for retrieving management information about a lot number of the product and a line number of the production site in the case where the system extracts a product from many products to perform a quality test of the product in a manner similar to the acceptance sampling of the factory.

Figure 4:
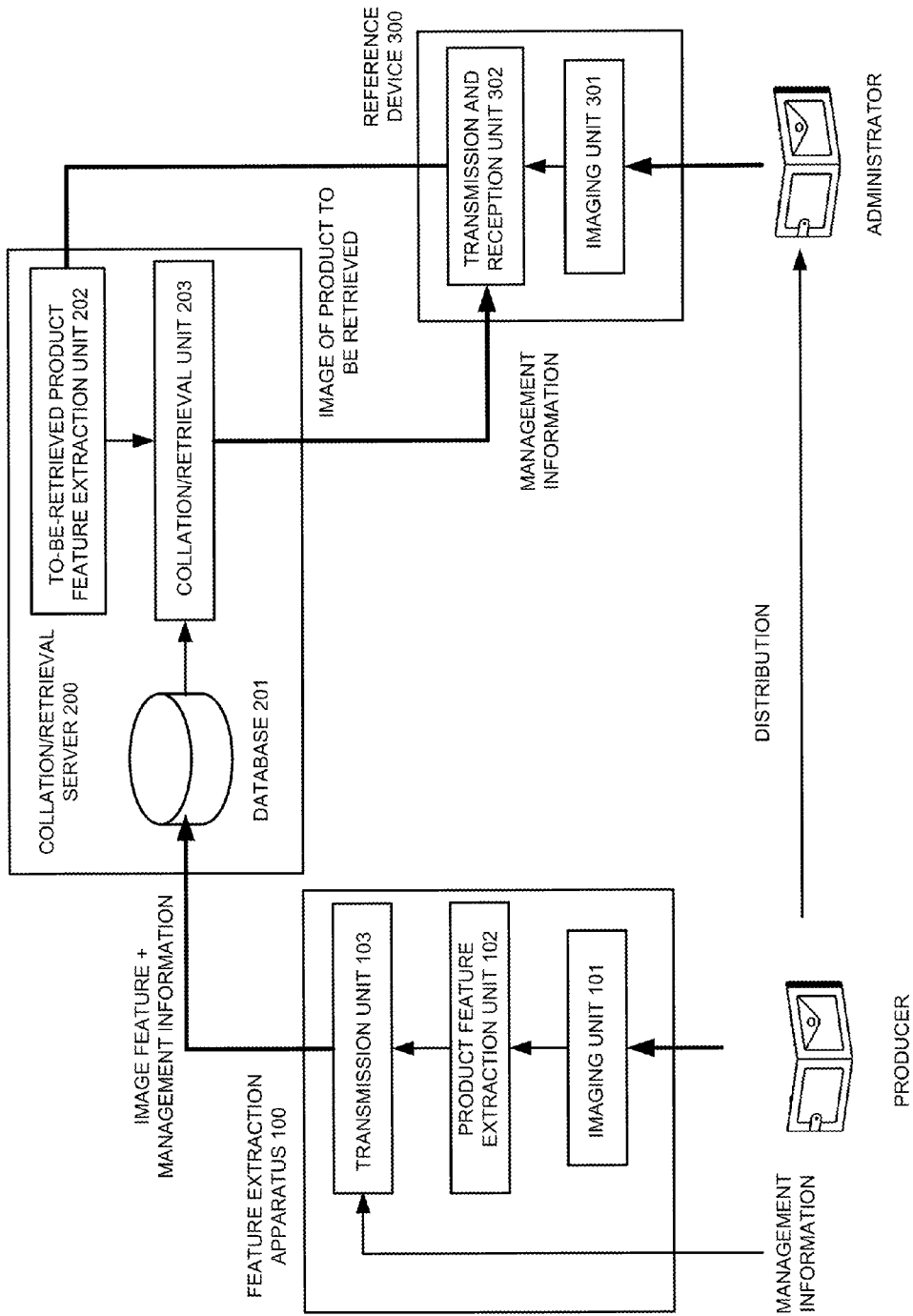
FIG. 4 is a block diagram of a management information retrieval system according to the embodiment.

FIG. 4 is a block diagram of the embodiment of the management information retrieval system.

As shown in FIG. 4, the management information retrieval system includes a feature extraction apparatus 100 belonging to a side of a leather wallet manufacturer, a collation/retrieval server 200 performing collation, and a collation device 300 belonging to a side of the quality control authority.

The image feature extraction apparatus 100 includes an imaging unit 101, a product feature extraction unit 102, and a transmission unit 103. The imaging unit 101 and the product feature extraction unit 102 are configured similarly to the above described imaging unit 1 and the product feature extraction unit 2, respectively. The transmission unit 103 transmits the image feature of the collation area of the wallet extracted by the product feature extraction unit 102 and the management information (including a production site, a producer name, a lot number, a production date, and quality information) for the collation thereof.

A collation server 200 includes a database 201, a to-be-retrieved product feature extraction unit 202, and a collation/retrieval unit 203. The to-be-retrieved product feature extraction unit 202 and the collation/retrieval unit 203 are configured similarly to the above described to-be-collated product feature extraction unit 5 and the collation/retrieval unit 6, respectively. The database 201 stores the image feature of the collation area of each wallet of the products, i.e., of the wallets, of the same kind transmitted from the image feature extraction apparatus 100 belonging to the side of the producer after the image feature is associated with the management information of the wallet.

A collation device 300 includes an imaging unit 301 and a transmission and reception unit 302. The imaging unit 301 is configured similarly to the above described imaging unit 4. The transmission unit 302 transmits an image of the wallet captured by the imaging unit 301 to the collation server 200. Also, the transmission unit 302 receives a retrieval result from the collation server 200.

Now, an operation of the above described configuration will be described below.

First, a registration operation of the image feature of the surface design of the wallet will be described.

The producer registers in advance the image feature of the logotype 10 stamped on the wallet as shown in FIG. 2 and the position of the collation area by reference to the logotype 10 in the product feature extraction unit 102. Then, the producer captures an image of the logotype 10 and an image of the surface of the wallet including the collation area determined by reference to the logotype 10 by the imaging unit 101.

The product feature extraction unit 102 detects the label 10 from the captured image of the wallet and extracts the image feature of the surface design of the collation area determined by reference to the detected label 10. At this time, the product feature extraction unit 102 normalizes the collation area determined in advance by reference to the logotype 10 based on the position and the posture of the logotype 10 on the image to extract the image feature of the normalized collation area.

The producer inputs the management information (e.g., information about a production site, a producer name, a lot number, a production date, and quality information) of the wallet thus captured into the image feature extraction apparatus 100. Then, the transmission unit 103 transmits the image feature of the wallet and the management information of the wallet to the collation server 200. This processing is repeated for the number of products the producer desires to register.

In the collation server 200, the image feature of the wallet and the management information of the wallet from the image feature extraction apparatus 100 belonging to the producer are registered in the database 201.

Now, an operation of the retrieval processing will be described below.

An administrator captures an image of the surface of the wallet corresponding to the collation area including the logotype 10 by the imaging unit 301 of the collation device 300 in order to perform the collation of a wallet to be collated. The captured image is transmitted to the collation server 200 by the transmission and reception unit 302.

A to-be-collated product feature extraction apparatus 202 of the collation server 200 detects the logotype 10 of the wallet to be collated from the received image by a method similar to the above described one to extract an image feature of the surface design of the collation area from the detected logotype 10. Then, the to-be-collated product feature extraction apparatus outputs the extracted image feature to the collation/retrieval unit 203.

In the collation/retrieval unit 203, an image feature having the highest similarity to the received image feature of the product to be retrieved is retrieved from the image features registered in the database 201. Then, the collation/retrieval unit 203 reads out the management information associated with the image feature to transmit the same to the collation device 300. Here, the collation/retrieval unit 203 is not configured such that the image feature having the similarity more than a predetermined threshold is retrieved in order to perform the collation such as the authenticity determination, but is configured such that the image feature having the highest similarity to the image feature of the product to be retrieved is retrieved from the image features registered in the database 201. This is because, during the quality test, a fake product is least likely to be contaminated. In other words, the authenticity determination processing that strictly checks the possible fake product against a genuine product is not needed here.

The collation device 300 receives the management information from the collation server 200 and notifies the received management information to the administrator.

According to this embodiment, as described above, even without specific equipment, the administrator can retrieve the management information of a specific product among a lot of products.

Meanwhile, in the above described embodiment, the product feature extraction unit 102 initially extracting the image feature of the product has been illustrated as being disposed on the device belonging to the producer. It is also possible for the to-be-retrieved product feature extraction unit 202 to share the roll. In this case, the image of the collation area of the product is transmitted from the side of the producer.

Figure 5:
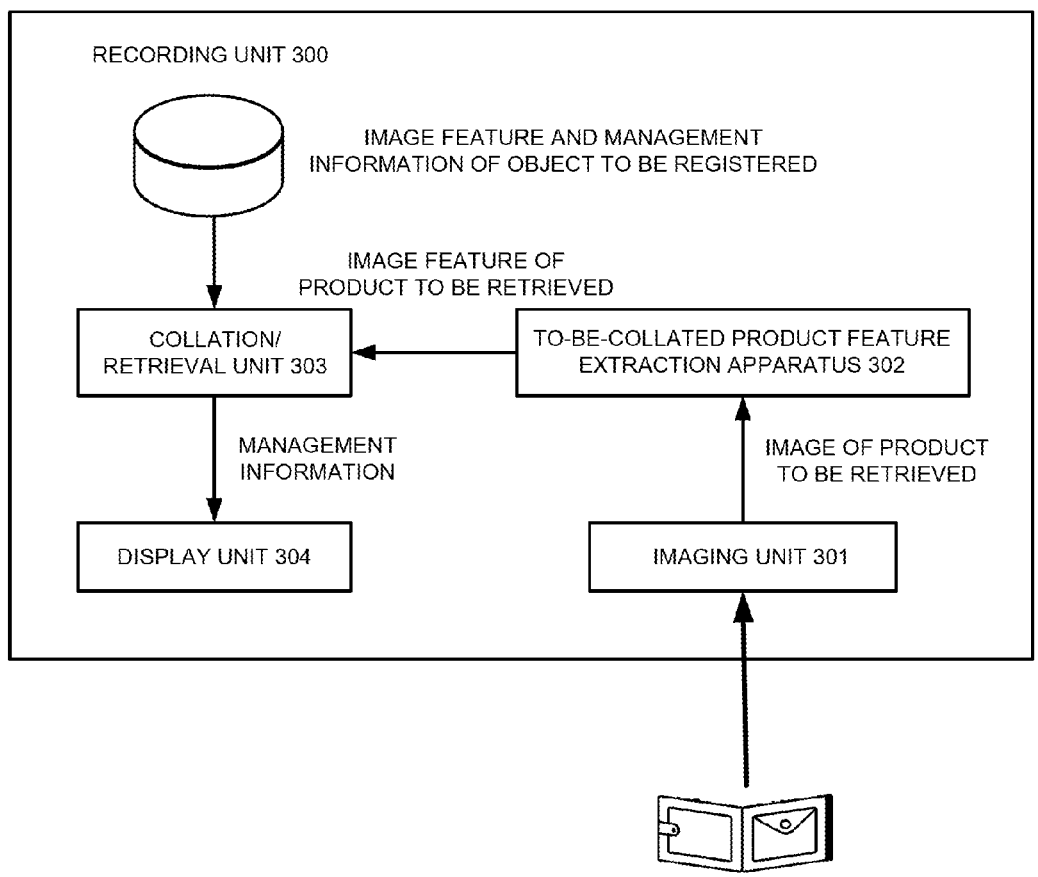
FIG. 5 illustrates a terminal device for retrieving management information.

Further, the above described embodiment has been illustrated as performing the collation processing by the collation server 200 from the side of the administrator via communication. It is also possible to down load in advance features and management information of a plurality of registered products from a database, e.g., the database 201 registering the image of the surface design and management information of the product to perform the retrieval processing without using the communication. Such management information retrieval apparatus includes, as shown in FIG. 5, a storage unit 300 storing the image feature of the surface design and the management information of the registered product registered by, for example, the producer, the imaging unit 301, the to-be-retrieved product feature extraction unit 302, a collation/retrieval unit 303, and a display unit 304. The imaging unit 301, the to-be-retrieved product feature extraction unit 302, and the collation/retrieval unit 303 are configured similarly to the above described imaging unit, the to-be-retrieved product feature extraction unit, and the collation/retrieval unit 303, respectively. The display unit 304 displays, for example, the management information of the collation/retrieval unit 303.

As it is obvious from the above description, it is also possible that the feature extraction apparatus and the collation/retrieval unit include hardware. Alternatively, it is also possible that the feature extraction apparatus and the collation/retrieval unit include computer program. In this case, a processor executed by a program stored in a program memory executes a function and an operation similar to those of the above described embodiment and examples.

The above described embodiment may be partially or entirely described as in the below described Supplementary note. This, however, should not be construed in a limiting sense.

(Supplementary note 1) A collation/retrieval system including a first imaging means capturing an image including at least a reference section common in every product and a predetermined collation area of the product determined in advance at a position relative to the reference section, a product feature extraction means detecting the reference section from the image captured by the first imaging means and extracting an image feature of the collation area determined by reference to the detected reference section, a storage means storing the extracted image feature of the collation area of the product, a second imaging means capturing an image including at least the reference section of a product to be collated and the predetermined collation area of the product determined by reference to the reference section, a to-be-collated product feature extraction means detecting the reference section of the product to be collated from the image captured by the second imaging means and extracting an image feature of the collation area determined by reference to the reference section, and a collation/retrieval means collating the stored image feature with the image feature of the collation area of the product to be collated.

(Supplementary note 2) The collation/retrieval system according to the Supplementary note 1, wherein the reference section includes a trademark, a logotype, a name of manufacturer, a manufacturing company, a brand name, a product name, and a product number attached to, printed, stamped, or branded on the product.

(Supplementary note 3) The collation/retrieval system according to the Supplementary note 1 or the Supplementary note 2, wherein the product feature extraction means and the to-be-collated product feature extraction means each store in advance the feature of the reference section and the position of the collation area determined by reference to the reference section, detect the predetermined section of the product from the captured image based on the feature of the predetermined section, and normalize the position and a size of the collation area by referring to the detected predetermined section to extract an image feature of the collation area.

(Supplementary note 4) The collation/retrieval system according to any one of Supplementary note 1 to Supplementary note 3, wherein the product is an industrial product including a leather product, a metal workpiece, a molten resin, and/or a ceramic portion.

(Supplementary note 5) The collation/retrieval system according to any one of Supplementary note 1 to Supplementary note 4, wherein the storage means stores a plurality of image features of collation areas extracted from a plurality of products to be retrieved and management information corresponding to the plurality of products to be retrieved in a mutually associated manner; and wherein the collation/retrieval means retrieves an image feature having the highest similarity to the image features of the collation areas of the plurality of products to be retrieved from the stored plurality of image features to output management information of a product corresponding to the image feature having the highest similarity.

(Supplementary note 6) A collation/retrieval server collating a product manufactured by or delivered from a producer or a distributor with a product to be collated including a storage means storing an image feature of a predetermined collation area of the product determined in advance at a position relative to a reference section common in every product, a to-be-collated product feature extraction means receiving an image of the product to be collated, detecting the reference section of the product to be collated from the received image, and extracting an image feature of the collation area determined by reference to the reference section and a collation means collating the stored image feature with the image feature of the collation area of the product to be collated.

(Supplementary note 7) The collation/retrieval server according to Supplementary note 6, further including a product feature extraction means receiving an image of a product manufactured by or delivered from a producer or a distributor, detecting the reference section of the product from the received image, and extracting the image feature of the collation area determined by reference to the reference section to register the extracted image feature of the collation area in the storage means.

(Supplementary note 8) The collation/retrieval server according to Supplementary note 6 or Supplementary note 7, wherein the product feature extraction means and the to-be-collated product feature extraction means each store in advance the feature of the reference section and the position of the collation area determined by reference to the reference section, detect the predetermined section of the product from the captured image based on the feature of the predetermined section, and normalize the position and a size of the collation area by referring to the detected predetermined section to extract the image feature of the collation area.

(Supplementary note 9) The collation/retrieval server according to any one of Supplementary note 6 to Supplementary note 8, wherein the storage means stores a plurality of image features of collation areas extracted from a plurality of products to be retrieved and management information corresponding to the plurality of products to be retrieved in a mutually associated manner; and wherein the collation/retrieval means retrieves an image feature having the highest similarity to the image features of the collation areas of the plurality of products to be collated from the stored plurality of image features to output management information of a product corresponding to the image feature having the highest similarity.

(Supplementary note 10) An image feature extraction apparatus including a feature extraction means detecting a reference section common in every product from an image of a product manufactured by or delivered from a producer or a distributor and an image of a product to be collated to extract an image feature of a collation area determined in advance at a position relative to the detected reference section.

(Supplementary note 11) The image feature extraction apparatus according to Supplementary note 10, wherein the feature extraction means stores in advance a feature of the reference section and a position of the collation area determined by reference to the reference section, detects the predetermined section of the product from the captured image based on the feature of the predetermined section, and normalizes the position and a size of the collation area by referring to the detected predetermined section to extract the image feature of the collation area.

(Supplementary note 12) The image feature extraction apparatus according to Supplementary note 10 or Supplementary note 11, further including a transmission means transmitting the image feature of the collation area to a collation server.

(Supplementary note 13) A collation/retrieval method including setting a predetermined section of a product formed into the same pattern to a reference section, setting an area existing at a standard position relative to the reference section to a collation area, and using an image feature in the collation area of the product for collation and retrieval of the product.

(Supplementary note 14) The collation/retrieval method according to Supplementary note 13 further including capturing an image including at least the reference section common in every product and the predetermined collation area of the product determined in advance at a position relative to the reference section, detecting the reference section from the captured image to extract the image feature of the collation area determined by reference to the detected reference section, storing the extracted image feature of the collation area of the product, capturing an image including at least the reference section of the product to be collated and the predetermined collation area of the product determined by reference to the reference section, detecting the reference section of the product to be collated from the captured image to extract the image feature of the collation area determined by reference to the reference section, and collating the stored image feature with the image feature of the collation area of the product to be collated.

(Supplementary note 15) The collation/retrieval method according to Supplementary note 13 or Supplementary note 14, wherein the reference section includes a trademark, a logotype, a name of manufacturer, a manufacturing company, a brand name, a product name, and a product number attached to, printed, stamped, or branded on the product.

(Supplementary note 16) The collation/retrieval method according to Supplementary note 13 or Supplementary note 15, wherein the extraction of the image feature includes storing in advance the feature of the reference section and the position of the collation area determined by reference to the reference section, detecting the predetermined section of the product from the captured image based on the feature of the predetermined section, and normalizing the position and a size of the collation area by referring to the detected predetermined section to extract the image feature of the collation area.

(Supplementary note 17) The collation/retrieval method according to any one of Supplementary note 13 to Supplementary note 16 includes storing a plurality of image features of collation areas extracted from a plurality of products to be retrieved and management information corresponding to the plurality of products to be retrieved in a mutually associated manner, and retrieving an image feature having the highest similarity to the image features of the collation areas of the plurality of products to be retrieved from the stored plurality of image features to output management information of a product corresponding to the image feature having the highest similarity.

(Supplementary note 18) The collation/retrieval method according to any one of Supplementary note 13 to Supplementary note 17, wherein the product is an industrial product including a leather product, a metal workpiece, a molten resin, and/or a ceramic portion.

(Supplementary note 19) A program causing a computer to detect a reference section common in every product from an image of a product manufactured by or delivered from a producer or a distributor and an image of a product to be collated to extract an image feature of a collation area determined in advance at a position relative to the detected reference section.

(Supplementary note 20) The program according to Supplementary note 19 causing the computer to execute collation processing in which the image feature of the collation area of the product to be collated is collated with a preliminary stored image feature of the collation area of the product.

(Supplementary note 21) The program according to Supplementary note 18 or Supplementary note 19 causing the computer to execute output processing in which, from a database in which a plurality of image features of the collation areas extracted from a plurality of products to be retrieved and management information corresponding to the plurality of products to be retrieved are stored in a mutually associated manner, an image feature having the highest similarity to the image features of collation areas of the products to be collated is retrieved from the stored plurality of image features to output management information of a product corresponding to the image feature having the highest similarity.

(Supplementary note 22) A collation unit including
a feature extraction means detecting, from an image of a product manufactured by or delivered from a producer or a distributor and an image of a product to be collated, a reference section common in every product to extract an image feature of a collation area determined in advance at a position relative to the detected reference section, and
a collation means collating a preliminary stored image feature with the image feature of the collation area of the product to be collated.

Hereinabove, the present invention has been illustrated by preferred embodiments and examples. It is noted that the present invention is not limited to the above described embodiments and examples, and various modifications are possible without departing from the technical scope of the present disclosure.

This application claims the benefit of Japanese Patent Application No. 2011-166789 filed Jul. 29, 2011, the disclosure of which is hereby incorporated by reference.

DESCRIPTION OF THE REFERENCE NUMERAL

1 Imaging unit
2 Product feature extraction unit
3 Storage unit
4 Imaging unit
5 To-be-collated product feature extraction unit
6 Collation/retrieval unit

The invention claimed is:

1. A collation/retrieval system collating a product manufactured by or delivered from a producer or a distributor with a product to be collated wherein:
a collation area is a partial area on a surface of the product; and
a reference section is a product identifying label on the product which is common among products, comprising:
a storage device that stores a surface pattern image feature of the collation area determined in advance at a position relative to the reference section; and
at least one processor configured to:
receive an image of the product to be collated;
detect the reference section in the product to be collated from the received image;
extract a surface pattern image feature of the collation area in the product to be collated as determined by reference to the detected reference section; and
collate the stored surface pattern image feature with the surface pattern image feature of the collation area of the product to be collated,
wherein the at least one processor is further configured to:
store in advance a feature of the reference section and the position of the collation area in the storage device;
detect the reference section based on the feature of the reference section;
normalize the position and a size of the collation area by referring to the reference section to extract the surface pattern image feature of the collation area; and
perform at least one of an identification of the collation area by a distance and angle from the reference section and a designation of the position and a range of the collation area by a relative value determined by reference to a size of the reference section.

2. The collation/retrieval system according to claim 1, wherein the at least one processor is further configured to:
receive an image of the product manufactured by or delivered from a producer or a distributor;
detect the reference section from the image received;
determine the collation area by reference to the reference section detected from the image received; and
extract the surface pattern image feature of the determined collation area to register the extracted surface pattern image feature of the detected collation area in the storage device.

3. The collation/retrieval system according to claim 1,
wherein the storage device stores a plurality of surface pattern image features of collation areas extracted from a plurality of products to be retrieved and management information corresponding to the plurality of products to be retrieved in a mutually associated manner; and
wherein the at least one processor identifies the stored surface pattern image feature from the plurality of surface pattern image features as having a highest similarity to the surface pattern image feature of the collation area of the product to be collated to output management information of the product.

4. An image feature extraction apparatus wherein:
a collation area is a partial area on a surface of a product; and
a reference section is a product identifying label on the product which is common among products, comprising a feature extraction unit that:
stores in advance a feature of the reference section common among products and a position of the collation area determined by reference to the reference section;
detects the reference section in an image of a product to be collated based on the feature of the reference section;

normalizes the position and a size of the collation area by referring to the detected reference section;

extracts a surface pattern image feature of the collation area based on the normalized position and size of the collation area; and performs at least one of an identification of the collation area by a distance and angle from the reference section and a designation of the position and the range of the collation area by a relative value determined by reference to a size of the reference section.

5. The image feature extraction apparatus according to claim 4, further comprising:

a transmission unit that transmits the surface pattern image feature of the collation area to a collation server.

6. A collation/retrieval method performed by at least one processor, comprising:

setting a predetermined section of a product comprising a product identifying label on the product to a reference section, wherein the product identifying label is the same among products;

setting a partial area on a surface of the product existing at a standard position relative to the reference section to a collation area;

storing a feature of the reference section and the position of the collation area relative to the reference section;

detecting the reference section from a captured image of the product based on the feature of the reference section;

normalizing the position and a size of the collation area by referring to the detected reference section;

extracting a surface pattern image feature of the collation area based on the normalized position and size of the collation area;

performing at least one of an identification of the collation area by a distance and angle from the reference section and a designation of the position and the range of the collation area by a relative value determined by reference to a size of the reference section; and using the surface pattern image feature in the collation area of the product for collation and retrieval of the product.

7. The collation/retrieval method according to claim 6, further comprising:

capturing a first image comprising at least the reference section common among products and the predetermined collation area of the product determined in advance at a position relative to the reference section;

detecting the reference section from the captured first image to extract the surface pattern image feature of the collation area determined by reference to the detected reference section;

storing the extracted surface pattern image feature of the collation area;

capturing a second image comprising at least the reference section of the product to be collated and the predetermined collation area of the product to be collated determined by reference to the reference section;

detecting the reference section of the product to be collated from the captured second image to extract the surface pattern image feature in the second image of the collation area determined by reference to the reference section; and collating the stored image feature with the surface pattern image feature of the collation area of the product to be collated.

8. The collation/retrieval method according to claim 6, wherein the reference section comprises a trademark, a logotype, a name of manufacturer, a manufacturing company, a brand name, a product name, and a product number attached to, printed, stamped, or branded on the product.

9. The collation/retrieval method according to claim 6 comprising:

storing a plurality of surface pattern image features of collation areas extracted from a plurality of products to be retrieved and management information corresponding to the plurality of products to be retrieved in a mutually associated manner, and identifying a stored surface pattern image feature from the plurality of stored surface pattern image features as having a highest similarity to the surface pattern image feature of the collation area of the product to be retrieved to output management information of the product to be retrieved.

10. The collation/retrieval method according to claim 6, wherein the product is an industrial product comprising a leather product, a metal workpiece, a molten resin, and/or a ceramic portion.

11. A collation/retrieval system collating a product manufactured by or delivered from a producer or a distributor with a product to be collated wherein:

a collation area is a partial area on a surface of the product; and a reference section is a product identifying label on the product which is common among products, comprising:

a storage unit that stores a minute image feature of the collation area determined in advance at a position relative to the reference section;

a product feature extraction unit;

a to-be-collated product feature extraction unit that receives an image of the product to be collated, detects the reference section in the product to be collated from the received image and extracts a minute image feature of the collation area in the product to be collated as determined by reference to the reference section; and a collation unit that collates the stored image feature with the minute image feature of the collation area of the product to be collated, wherein the product feature extraction unit and the to-be-collated product feature extraction unit each:

store in advance a feature of the reference section and the position of the collation area;

detect the reference section based on the feature of the reference section;

normalize the position and a size of the collation area by referring to the reference section to extract the surface pattern image feature of the collation area;

and perform at least one of an identification of the collation area by a distance and angle from the reference section and a designation of the position and the range of the collation area by a relative value determined by reference to a size of the reference section.

12. A collation/retrieval system collating a product manufactured by or delivered from a producer or a distributor with a product to be collated wherein:

a collation area is a partial area on a surface of the product; and a reference section is a product identifying label on the product which is common among products, comprising:

a memory device that stores a surface pattern image feature of the collation area determined in advance at a position relative to the reference section; and a microprocessor programmed to:

store in advance a feature of the reference section and the position of the collation area;

receive an image of the product to be collated;

detect the reference section in the product to be collated from the received image based on the feature of the reference section;

normalize the position and a size of the collation area by referring to the detected reference section;

perform at least one of an identification of the collation area by a distance and angle from the reference section and a designation of the position and the range of the collation area by a relative value determined by reference to a size of the reference section;

extract a surface pattern image feature of the collation area in the product to be collated as determined based on the normalized position and size of the collation area; and collate the stored surface pattern image feature with the surface pattern image feature of the collation area of the product to be collated.

13. An image feature extraction apparatus wherein:

a collation area is a partial area on a surface of a product; and a reference section is a product identifying label on the product which is common among products, comprising:

a microprocessor programmed to:

Store in advance a feature of the reference section and a position of the collation area determined by reference to the reference section;

detect the reference section in an image of a product to be collated based on the feature of the reference section;

normalize the position and size of the collation area by referring to the detected reference section;

perform at least one of an identification of the collation area by a distance and angle from the reference section and a designation of the position and the range of the collation area by a relative value determined by reference to a size of the reference section; and extract a surface pattern image feature of the collation area based on the normalized position and size of the collation area.

14. A collation/retrieval method using a microprocessor, the microprocessor to execute:

setting a predetermined section of a product comprising a product identifying label on the product to a reference section, wherein the product identifying label is the same among products;

setting a partial area on a surface of the product existing at a standard position relative to the reference section to a collation area;

storing a feature of the reference section and the position of the collation area relative to the reference section;

detecting the reference section from a captured image of the product based on the feature of the reference section;

normalizing the position and a size of the collation area by referring to the detected reference section;

performing at least one of an identification of the collation area by a distance and angle from the reference section and a designation of the position and the range of the collation area by a relative value determined by reference to a size of the reference section;

extracting the surface pattern image feature of the collation area based on the normalized position and size of the collation area; and using the surface pattern image feature in the collation area of the product for collation and retrieval of the product.

15. The collation/retrieval system of claim 1 wherein the product identifying label comprises at least one of a trademark, a logotype, a name of a manufacturer, a brand name, a product name, and a product number.

16. The image feature extraction apparatus of claim 4 wherein the product identifying label comprises at least one of a trademark, a logotype, a name of a manufacturer, a brand name, a product name, and a product number.

17. The collation/retrieval method of claim 6 wherein the product identifying label comprises at least one of a trademark, a logotype, a name of a manufacturer, a brand name, a product name, and a product number.

18. The collation/retrieval system of claim 11 wherein the product identifying label comprises at least one of a trademark, a logotype, a name of a manufacturer, a brand name, a product name, and a product number.

19. The collation/retrieval system of claim 12 wherein the product identifying label comprises at least one of a trademark, a logotype, a name of a manufacturer, a brand name, a product name, and a product number.

20. The image feature extraction apparatus of claim 13 wherein the product identifying label comprises at least one of a trademark, a logotype, a name of a manufacturer, a brand name, a product name, and a product number.

21. The collation/retrieval method of claim 14 wherein the product identifying label comprises at least one of a trademark, a logotype, a name of a manufacturer, a brand name, a product name, and a product number.

* * * * *